United States Patent Office 3,426,129
Patented Feb. 4, 1969

3,426,129
TREATMENT OF DEPRESSION OF THE CENTRAL NERVOUS SYSTEM WITH ALKYL ESTERS OF 1-AZIRIDINEPROPIONIC ACID
Arthur G. Jelinek, Wilmington, Del., assignor to E. I. du Pont de Nemours, Wilmington, Del., a corporation of Delaware
No Drawing. Continuation-in-part of application Ser. No. 324,886, Nov. 19, 1963. This application Aug. 20, 1965, Ser. No. 482,004
U.S. Cl. 424—244        12 Claims
Int. Cl. A61k 27/00

ABSTRACT OF THE DISCLOSURE

Effecting depression of the central nervous system in warm-blooded animals with an alkyl ester of 1-aziridinepropionic acid. A typical compound is the methyl ester of 1-aziridinepropionic acid.

---

This application is a continuation-in-part of my earlier application Ser. No. 324,886 filed Nov. 19, 1963 now abandoned.

This invention relates to alkyl esters of 1-aziridinepropionic acid. More particularly, this invention refers to the use of alkyl esters of 1-aziridinepropionic acid as pharmaceutical agents.

According to the present invention, alkyl esters of 1-aziridinepropionic acid are useful for administration to warm-blooded animals as central nervous system depressants. This term is used in its ordinary meaning and is intended to include within its purview associated effects such as muscle relaxant activity as well as ataractic or tranquilizing activity.

The compounds within the scope of this invention are the alkyl esters of the above compound wherein the alkyl group can be straight or branched chain and can have from 1 through 22 carbons, preferably from 1 through 12, and most preferably from 1 through 6. Typical compounds within the scope are the methyl ester, ethyl ester, n-propyl ester, isopropyl ester, n-butyl ester, isobutyl ester, tert-butyl ester, n-hexyl ester, n-octyl ester, dodecyl ester, and octadecyl ester.

These compounds are made by the addition of ethylene imine to the appropriate acrylic acid ester. The formula for this acrylic acid ester is $CH_2=CH-COOR$ where R is the alkyl substituent. Reaction conveniently takes place at a temperature of 10° to about 100° C. and preferably below about 40° or 50° C., for 2 to 48 hours reaction time. The reaction generally proceeds satisfactorily without a solvent but if desired, a solvent medium such as ethanol, benzene, xylene or the like can be used. If desired, a strong basic catalyst such as potassium tert-butoxide or a quaternary hydroxide such as benzyl trimethyl ammonium hydroxide can be used.

Stable, pharmacologically acceptable salts, e.g., citrate, tartrate, pamoate, etc., of the 1-aziridinepropionic acid, alkyl esters, are contemplated to be within the purview of the present invention and are considered to be obvious equivalents of the present claimed invention.

In the practice of this invention, the active pharmaceutical agents may be administered alone but are generally administered with a pharmaceutical carrier selected on the basis of the chosen route of administration and standard pharmaceutical practice. For example, they may be administered orally in the form of tablets or capsules containing such excipients as starch, milk sugar, certain types of clay, etc. They may be administered orally in the form of elixirs or oral suspensions which may contain coloring and flavoring agents. They may be injected parenterally and for this use may be prepared in the form of sterile aqueous solutions containing other solutes such as saline or glucose in sufficient quantity to make the solution isotonic. For intramuscular administration compositions of the compounds of this invention may be prepared in an oil base such as peanut or sesame oil.

The pharmaceutical agents within the scope of this invention will be administered in pharmaceutically effective amounts. This will range from 0.5 to 500 milligrams per day and preferably 2 to 200 milligrams per day. When they are administered orally a larger quantity will be required to produce the same effect as a smaller quantity given parenterally. Parenteral administration of from 0.1 mg. to 250 mg. of active agent should be suitable to obtain some effect. Administration can also be by vapor or spray through the mouth or nasal passages.

The compositions of this invention may take a variety of forms. Various diluents may be employed and the percentage of active ingredients may be varied. It is necessary that an active ingredient form a proportion of the composition such that a suitable dosage form will be obtained. Obviously several dosage unit forms may be administered at about the same time. Although compositions with less than 0.005% by weight of active ingredient are suitable, it is preferred to use compositions containing not less than 0.005% of the active agent because otherwise the amount of carrier becomes excessively large. Activity increases with the concentration of the active agent. The percentage by weight of active agent may be 10, 50, 75, 95% or even higher. Dosage unit forms may be prepared with a minor proportion of a carrier and a major proportion of active materials and vice-versa.

The following examples are given solely for the purpose of illustration and are not to be construed as limitations of this invention, many variations of which are possible without departing from the spirit or scope thereof.

Example 1

A large number of unit capsules are prepared for oral administration by mixing the following ingredients:

| | Parts by weight |
|---|---|
| 1-aziridinepropionic acid, methyl ester | 2,000 |
| Lactose U.S.P. | 7,950 |
| Dry pyrogenic silica $SiO_2$ with particle size of 0.015 micron, surface area of 200 m.$^2$/gm., and bulk density of 2.2 lbs./cu. ft. ("Cabosil," Cabot Corp.) | 50 |

After mixing, the mixture is screened through a 40 mesh screen and encapsulated in No. 3 two-piece hard gelatin capsules.

Example 2

The active ingredient of Example 1 (20 parts by weight) is dispersed in 100 parts by volume of corn oil and encapsulated in standard soft gelatin capsules.

Example 3

Tablets for oral administration are prepared by mixing 50 milligrams of the active ingredient of Example 1, 2.5 milligrams of gelatin, 2.5 milligrams of magnesium stearate and 100 milligrams of starch, and forming the mixture into tablets by a conventional tableting machine. Slow release pills and tablets can also be used.

Example 4

A parenteral composition suitable for administration by injection is prepared by dissolving 5% by weight of the active ingredient of Example 1 in 95% by volume of physiological saline and sterilizing the resultant solution by filtration. A buffer can be used if desired.

The above examples can be repeated by substituting other compounds within the scope of this invention for the methyl ester of the examples. Thus, the ethyl ester, n-propyl ester, isopropyl ester, n-butyl ester, isobutyl ester, tert-butyl ester, n-hexyl ester, n-octyl ester, dodecyl ester and octadecyl ester can be used.

Example 5

A composition suitable for aerosolization is prepared by dissolving 5% by weight of aziridinepropionic acid, methyl ester in 95% by volume of methylene dichloride.

Instead of the methyl ester other esters can be used such as ethyl ester, n-propyl ester, isopropyl ester, n-butyl ester, isobutyl ester, tert-butyl ester, n-hexyl ester, n-octyl ester, dodecyl ester and octadecyl ester. Like compositions are formed with all these compounds.

Example 6

Mice are injected via the tail vein with the methyl ester of aziridinepropionic acid, formulated as in Example 4, at a dosage of 1 mg./kg. of active ingredient. Marked central nervous system depression results as exemplified by depression of spontaneous motor activity for several hours. Toxicity occurs at such dosages that a therapeutic ratio of 50 or more is obtained.

Example 7

Beagle dogs are injected via the cephalic vein with the tert-butyl ester of aziridinepropionic acid, formulated as in Example 4, at a dosage of 3.2 mg./kg. Central nervous system depression results as shown by sedation, decreased locomotor activity, and inability to perform sustained physical exercise. Recovery of normal function occurs in about one hour.

Example 8

Cats are given intravenous administration of the n-hexyl ester of aziridinepropionic acid at 1 mg./kg. formulated in the manner of the composition of Example 4. Central nervous system depression results promptly as shown by decreased locomotor activity, ataxia, and difficulty in maintenance of posture. Recovery without injurious after-effects occurs in a few hours.

Example 9

A male rhesus monkey is given via the femoral vein an injection of the methyl ester of aziridinepropionic acid, formulated as in Example 4, at a dosage of 0.75 mg./kg. Central nervous system depression occurs and the animal becomes sedated and briefly prostrated. Toxicity occurs at such doses that a therapeutic ratio of 10 or more is obtained.

Example 10

Rhesus monkeys are confined in a dynamic exposure chamber into which the composition of Example 5 is aerosolized using the sec-butyl ester of aziridinepropionic acid so that a CT 5000 value (C=concentration in micrograms per liter; T=time in minutes) of the sec-butyl ester of aziridinepropionic acid is maintained for five minutes. The animals show central nervous system depression and become ataxic and very quiescent for about 90 minutes. Recovery is uneventful.

Example 11

Mongolian gerbils are placed in a 16-liter semi-dynamic exposure chamber into which the isopropyl ester of aziridinepropionic acid, formulated as in Example 5, is aerosolized so that the animals are exposed to 2000 CT for one minute. The gerbils show marked depression and decreased locomotor activity for about one hour after treatment.

Example 12

Mice are placed in a 2.85-liter bell-jar chamber into which an acetone-solution of the methyl ester of aziridinepropionic acid is aerosolized so that the animals are exposed to a nominal 8000 CT of the compound for two minutes. Pronounced central nervous system depression occurs as shown by absence of locomotor activity by the mice as measured in a Woodard Activity Cage Counter 30 minutes after exposure. Recovery is normal and no toxicity occurs at CT values 35 times greater than that used.

Example 13

Rats are treated intramuscularly with one n-propyl ester of aziridinepropionic acid at a dosage of 5 mg./kg. In a few minutes central nervous system depression results, as exemplified by ataxia and decrease in spontaneous motor activity. Toxicity occurs at such doses that a therapeutic ratio of 30 or more is obtained.

Example 14

The isopropyl ester of aziridinepropionic acid, administered as the composition of Example 4 intraperitoneally to mice, produces central nervous depression exemplified by decreased locomotor activity and decreased placing reflex. Toxicity occurs at such doses that a therapeutic ratio of 30 or more is obtained.

Example 15

The n-butyl ester of aziridinepropionic acid is administered as the composition of Example 4 subcutaneously to rats at a dosage of four mg./kg. Central nervous system depression characterized by abnormal gait and decreased spontaneous activity results. Toxicity occurs at such doses that a therapeutic ratio of 25 or more is obtained.

Example 16

A rhesus monkey is given by stomach tube the isobutyl ester of aziridinepropionic acid in the composition of Example 2. A dosage of five mg./kg. is used. Marked sedation for several hours followed by normal recovery is observed.

The above and similar examples can be carried out in accordance with the teachings of this invention, as will be readily understood by persons skilled in the art, by substitution of components and amounts in place of those specified.

The foregoing detailed description has been given for clearness of understanding only and no unnecessary limitations are to be understood therefrom.

The invention claimed is:

1. The method of effecting depression of the central nervous system which comprises administering to a warm-blooded animal a pharmaceutically effective amount of an alkyl ester of 1-aziridinepropionic acid, the alkyl ester having 1 to 22 carbon atoms present.

2. The method as set forth in claim 1 wherein said alkyl group has 1 through 12 carbons.

3. The method as set forth in claim 1 wherein said alkyl group has 1 through 6 carbon atoms.

4. The method as set forth in claim 1 wherein said ester is the methyl ester.

5. The method as set forth in claim 1 wherein said ester is the ethyl ester.

6. The method as set forth in claim 1 wherein said ester is the n-propyl ester.

7. The method as set forth in claim 1 wherein said ester is the isopropyl ester.

8. The method as set forth in claim 1 wherein said ester is the n-butyl ester.

9. The method as set forth in claim 1 wherein said ester is the isobutyl ester.

10. The method as set forth in claim 1 wherein said ester is the tert-butyl ester.

11. The method as set forth in claim 1 wherein said ester is the n-pentyl ester.

12. The method as set forth in claim 1 wherein said ester is the n-hexyl ester.

References Cited

Chemical Abstracts, Sixth Collective Index, vol. 51–55, 1957–1961 (p. 12495).

ALBERT T. MEYERS, *Primary Examiner.*

S. J. FRIEDMAN, *Assistant Examiner.*